United States Patent
Linguanti et al.

(10) Patent No.: US 12,026,643 B2
(45) Date of Patent: *Jul. 2, 2024

(54) SYSTEMS AND METHODS FOR A SMART VIRTUAL QUEUE

(71) Applicant: Universal City Studios LLC, Universal City, CA (US)

(72) Inventors: Nicholas Linguanti, Orlando, FL (US); Casey Barreto, Orlando, FL (US); William Austin Kelly, Orlando, FL (US); Kyle P. Hanley, Orlando, FL (US); Mark James Traynor, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/150,618

(22) Filed: Jan. 5, 2023

(65) Prior Publication Data

US 2023/0153707 A1     May 18, 2023

Related U.S. Application Data

(63) Continuation of application No. 16/714,223, filed on Dec. 13, 2019, now Pat. No. 11,568,333.
(Continued)

(51) Int. Cl.
*G06Q 10/0631* (2023.01)
*A63G 21/18* (2006.01)

(52) U.S. Cl.
CPC ......... *G06Q 10/0631* (2013.01); *A63G 21/18* (2013.01)

(58) Field of Classification Search
CPC .... G06Q 10/00; G06Q 10/06; G06Q 10/0631; G06Q 10/063116; G06Q 10/06315;
(Continued)

(56) References Cited

U.S. PATENT DOCUMENTS 5,502,806 A    3/1996  Mahoney et al.
5,566,327 A   10/1996  Sehr
(Continued)

FOREIGN PATENT DOCUMENTS

CN   101498586 A   8/2009
CN   101833698 A   9/2010
(Continued)

OTHER PUBLICATIONS

Putra et al., QBLE-Theme Park Queueing System Using Wearable Device, Aug. 1, 2017, 2017 IEEE 3rd International Conference on Engineering Technologies and Social Sciences, IEEE, pp. 1-6 (Year: 2017).*

(Continued)

*Primary Examiner* — Robert D Rines
(74) *Attorney, Agent, or Firm* — Fletcher Yoder, P.C.

(57) ABSTRACT

A system includes a virtual queue controller configured to receive an indication of a reduced capacity event from an amusement park attraction, determine a reduction in capacity of the attraction, identify each guest having a return time in a virtual queue of the attraction that is affected by the reduced capacity event, remove guests having affected return times from the virtual queue, and generate a reaccommodation time slot for the guests removed from the virtual queue, select two or more updated return times within the reaccommodation time slot for each of the guests removed from the virtual queue, provide a notification to each guest removed from the virtual queue requesting guest input to select a single updated return time from the two or more updated return times, and return each guest to the virtual queue upon receiving a corresponding selection of the single updated return time.

20 Claims, 5 Drawing Sheets

Related U.S. Application Data

(60) Provisional application No. 62/867,634, filed on Jun. 27, 2019.

(58) Field of Classification Search
CPC .......... G06Q 30/02; A63G 21/18; A63G 7/00; A63G 21/00; A63G 27/00; A63G 31/00; A63G 4/00
See application file for complete search history.

(56) References Cited

U.S. PATENT DOCUMENTS

| | | | |
|---|---|---|---|
| 5,694,514 A | 12/1997 | Evans et al. |
| 5,946,444 A | 8/1999 | Evans et al. |
| 5,978,770 A | 11/1999 | Waytena et al. |
| 5,987,420 A | 11/1999 | Maeda et al. |
| 5,987,421 A | 11/1999 | Chuang |
| 6,078,928 A | 6/2000 | Schnase et al. |
| 6,142,368 A | 11/2000 | Mullins et al. |
| 6,173,209 B1 | 1/2001 | Laval et al. |
| 6,259,786 B1 | 7/2001 | Gisby |
| 6,307,952 B1 | 10/2001 | Dietz |
| 6,424,623 B1 | 7/2002 | Borgstahl et al. |
| 6,526,158 B1 | 2/2003 | Goldberg |
| 6,529,786 B1 | 3/2003 | Sim |
| 6,535,376 B2 | 3/2003 | Fujita et al. |
| 6,629,019 B2 | 9/2003 | Legge et al. |
| 6,748,364 B1 | 6/2004 | Waytena et al. |
| 6,785,539 B2 | 8/2004 | Hale et al. |
| 6,813,608 B1 | 11/2004 | Baranowski |
| 6,819,759 B1 | 11/2004 | Khuc et al. |
| 6,845,361 B1 | 1/2005 | Dowling |
| 6,873,260 B2 | 3/2005 | Lancos et al. |
| 6,889,098 B1 | 5/2005 | Laval et al. |
| 6,889,900 B2 | 5/2005 | Davies et al. |
| 6,937,998 B1 | 8/2005 | Swartz et al. |
| 7,029,400 B2 | 4/2006 | Briggs |
| 7,047,205 B2 | 5/2006 | Hale et al. |
| 7,136,822 B2 | 11/2006 | Kimura et al. |
| 7,188,767 B2 | 3/2007 | Penuela et al. |
| 7,204,425 B2 | 4/2007 | Mosher, Jr. et al. |
| 7,212,983 B2 | 5/2007 | Redmann et al. |
| 7,222,080 B2 | 5/2007 | Hale et al. |
| 7,224,967 B2 | 5/2007 | Hale et al. |
| 7,327,251 B2 | 2/2008 | Corbett, Jr. |
| 7,366,512 B1 | 4/2008 | Kefalas et al. |
| 7,400,932 B2 | 7/2008 | Ackley et al. |
| 7,430,411 B2 | 9/2008 | Sengupta et al. |
| 7,496,445 B2 | 2/2009 | Mohsini et al. |
| 7,505,474 B2 | 3/2009 | Walter |
| 7,516,148 B2 | 4/2009 | Waytena et al. |
| 7,532,941 B2 | 5/2009 | Hale et al. |
| 7,541,926 B2 | 6/2009 | Dugan et al. |
| 7,603,321 B2 | 10/2009 | Gurvey |
| 7,642,921 B2 | 1/2010 | Cutler et al. |
| 7,674,184 B2 | 3/2010 | Briggs et al. |
| 7,685,009 B2 | 3/2010 | Halavais et al. |
| 7,685,014 B2 | 3/2010 | Dean |
| 7,706,904 B2 | 4/2010 | Jones et al. |
| 7,720,718 B2 | 5/2010 | Hale et al. |
| 7,729,382 B2 | 6/2010 | Rosner et al. |
| 7,739,925 B2 | 6/2010 | Foster |
| 7,752,146 B2 | 7/2010 | Lert, Jr. |
| 7,756,745 B2 | 7/2010 | Leet et al. |
| 7,775,894 B2 | 8/2010 | Henry et al. |
| 7,778,937 B2 | 8/2010 | Ferrara et al. |
| 7,787,965 B2 | 8/2010 | Hale et al. |
| 7,788,215 B2 | 8/2010 | Trowbridge et al. |
| 7,793,109 B2 | 9/2010 | Ortiz |
| 7,801,629 B2 | 9/2010 | Hale et al. |
| 7,801,752 B2 | 9/2010 | Neulight |
| 7,802,724 B1 | 9/2010 | Nohr |
| 7,817,990 B2 | 10/2010 | Pamminger et al. |
| 7,826,966 B2 | 11/2010 | Little et al. |
| 7,837,567 B2 | 11/2010 | Holzberg et al. |
| 7,881,713 B2 | 2/2011 | Hale et al. |
| 7,885,763 B2 | 2/2011 | Havens |
| 7,895,066 B2 | 2/2011 | Waytena et al. |
| 7,921,297 B2 | 4/2011 | Ortiz et al. |
| 7,942,320 B2 | 5/2011 | Joe |
| 7,966,215 B1 | 6/2011 | Myers et al. |
| 7,994,910 B2 | 8/2011 | Brooks et al. |
| 8,016,667 B2 | 9/2011 | Benbrahim |
| 8,082,165 B2 | 12/2011 | Natsuyama et al. |
| 8,126,782 B1 | 2/2012 | Zhu et al. |
| 8,200,515 B2 | 6/2012 | Natsuyama et al. |
| 8,226,493 B2 | 7/2012 | Briggs et al. |
| 8,231,047 B2 | 7/2012 | Canora |
| 8,253,533 B2 | 8/2012 | Jones |
| 8,253,542 B2 | 8/2012 | Canora et al. |
| 8,275,767 B2 | 9/2012 | Shepherd et al. |
| 8,284,924 B2 | 10/2012 | Dube et al. |
| 8,294,549 B2 | 10/2012 | Samovar et al. |
| 8,296,983 B2 | 10/2012 | Padgett et al. |
| 8,313,381 B2 | 11/2012 | Ackley et al. |
| 8,330,587 B2 | 12/2012 | Kupstas |
| 8,333,321 B2 | 12/2012 | Gressel et al. |
| 8,396,001 B2 | 3/2013 | Jung et al. |
| 8,396,727 B2 | 3/2013 | Waytena et al. |
| 8,401,334 B2 | 3/2013 | Neville et al. |
| 8,416,087 B2 | 4/2013 | Canora et al. |
| 8,424,716 B2 | 4/2013 | Hegan et al. |
| 8,425,314 B2 | 4/2013 | Benbrahim |
| 8,430,749 B2 | 4/2013 | Nelson et al. |
| 8,452,708 B1 | 5/2013 | Birenbaum et al. |
| 8,453,926 B2 | 6/2013 | Hunt |
| 8,462,994 B2 | 6/2013 | Ortiz et al. |
| 8,489,451 B2 | 7/2013 | Ramchandani |
| 8,489,657 B2 | 7/2013 | Shepherd et al. |
| 8,498,900 B1 | 7/2013 | Spirin et al. |
| 8,500,031 B2 | 8/2013 | Naelon |
| 8,510,136 B2 | 8/2013 | Charania et al. |
| 8,510,163 B2 | 8/2013 | Hess et al. |
| 8,565,735 B2 | 10/2013 | Wohlwend et al. |
| 8,577,734 B2 | 11/2013 | Treyz et al. |
| 8,581,721 B2 | 11/2013 | Asher et al. |
| 8,608,548 B2 | 12/2013 | Mattice et al. |
| 8,612,278 B1 | 12/2013 | Ashley, Jr. et al. |
| 8,616,984 B2 | 12/2013 | Mattice et al. |
| 8,618,935 B2 | 12/2013 | Felt et al. |
| 8,654,965 B2 | 2/2014 | Dube et al. |
| 8,700,005 B1 | 4/2014 | Kiraly et al. |
| 8,731,997 B2 | 5/2014 | Corbett et al. |
| 8,732,101 B1 | 5/2014 | Wilson et al. |
| 8,750,576 B2 | 6/2014 | Huang et al. |
| 8,750,784 B2 | 6/2014 | Ortiz et al. |
| 8,751,472 B2 | 6/2014 | Mei et al. |
| 8,762,101 B2 | 6/2014 | Yuen et al. |
| 8,773,245 B2 | 7/2014 | Canora et al. |
| 8,774,839 B2 | 7/2014 | Busch |
| 8,775,244 B2 | 7/2014 | Boss et al. |
| 8,793,314 B2 | 7/2014 | Spivak et al. |
| 8,798,643 B1 | 8/2014 | Boyle et al. |
| 8,803,366 B2 | 8/2014 | Proud |
| 8,810,430 B2 | 8/2014 | Proud |
| 8,821,238 B2 | 9/2014 | Ackley et al. |
| 8,827,810 B2 | 9/2014 | Weston et al. |
| 8,830,030 B2 | 9/2014 | Arthurs et al. |
| 8,831,963 B2 | 9/2014 | Backer et al. |
| 8,851,372 B2 | 10/2014 | Zhou et al. |
| 8,866,673 B2 | 10/2014 | Mendelson |
| 8,870,641 B2 | 10/2014 | Dabrowskiqqq |
| 8,879,440 B2 | 11/2014 | Guo et al. |
| 8,896,485 B2 | 11/2014 | Mendelson |
| 8,897,808 B2 | 11/2014 | Farris |
| 8,913,011 B2 | 12/2014 | Barney et al. |
| 8,924,432 B2 | 12/2014 | Richards et al. |
| 8,948,541 B2 | 2/2015 | Neville et al. |
| 8,949,146 B2 | 2/2015 | Fisher |
| 8,954,091 B1 | 2/2015 | Boyle et al. |
| 8,972,048 B2 | 3/2015 | Canora et al. |
| 8,979,646 B2 | 3/2015 | Moser et al. |
| 8,989,779 B1 | 3/2015 | Centore, III |
| 9,002,736 B2 | 4/2015 | Wohlwend et al. |

(56) References Cited

U.S. PATENT DOCUMENTS

| | | |
|---|---|---|
| 9,138,650 B2 | 9/2015 | Barney et al. |
| 9,149,717 B2 | 10/2015 | Barney et al. |
| 9,162,148 B2 | 10/2015 | Barney et al. |
| 10,943,188 B2 | 3/2021 | Polk et al. |
| 11,640,626 B2 | 5/2023 | Hanley et al. |
| 2002/0007292 A1 | 1/2002 | Paxton et al. |
| 2002/0046068 A1 | 4/2002 | Koh |
| 2002/0070865 A1 | 6/2002 | Lancos et al. |
| 2002/0082897 A1 | 6/2002 | Menelly et al. |
| 2002/0099576 A1 | 7/2002 | MacDonald et al. |
| 2002/0116233 A1 | 8/2002 | Kuge et al. |
| 2002/0116235 A1 | 8/2002 | Grimm et al. |
| 2002/0174003 A1 | 11/2002 | Redmann et al. |
| 2003/0030561 A1 | 2/2003 | Yafuso et al. |
| 2003/0041105 A1 | 2/2003 | Patrick |
| 2003/0093167 A1 | 5/2003 | Sim |
| 2003/0102956 A1 | 6/2003 | McManus et al. |
| 2003/0195760 A1 | 10/2003 | Kim et al. |
| 2004/0006497 A1 | 1/2004 | Nestor et al. |
| 2004/0059614 A1 | 3/2004 | Brown et al. |
| 2004/0100390 A1 | 5/2004 | Giraldin et al. |
| 2004/0117219 A1 | 6/2004 | Sugimoto et al. |
| 2004/0117528 A1 | 6/2004 | Beacher et al. |
| 2004/0158482 A1 | 8/2004 | Hale et al. |
| 2004/0172316 A1 | 9/2004 | Hale et al. |
| 2004/0225540 A1 | 11/2004 | Waytena et al. |
| 2005/0045710 A1 | 3/2005 | Burke |
| 2005/0060173 A1 | 3/2005 | Hale et al. |
| 2005/0070258 A1 | 3/2005 | Stanco |
| 2005/0080675 A1 | 4/2005 | Lovegreen et al. |
| 2005/0168340 A1 | 8/2005 | Mosher, Jr. et al. |
| 2005/0198107 A1 | 9/2005 | Cuhls et al. |
| 2005/0200455 A1 | 9/2005 | Veni, III et al. |
| 2005/0240453 A1 | 10/2005 | Lyons |
| 2005/0278215 A1 | 12/2005 | Seele, Jr. |
| 2006/0002413 A1 | 1/2006 | Tsutazawa |
| 2006/0068787 A1 | 3/2006 | Deshpande et al. |
| 2006/0080158 A1* | 4/2006 | Schweizer ............ G06Q 10/06 700/9 |
| 2006/0100985 A1 | 5/2006 | Mark et al. |
| 2006/0147005 A1 | 7/2006 | Taub |
| 2006/0273920 A1 | 12/2006 | Doan et al. |
| 2007/0042748 A1 | 2/2007 | Macarthur |
| 2007/0064904 A1 | 3/2007 | Wesley |
| 2007/0088701 A1 | 4/2007 | Rao |
| 2007/0130313 A1 | 6/2007 | King |
| 2007/0156846 A1 | 7/2007 | Seward |
| 2007/0168390 A1 | 7/2007 | Mardirossian |
| 2007/0174042 A1 | 7/2007 | Thompson |
| 2007/0203763 A1 | 8/2007 | Ackley et al. |
| 2007/0225911 A1 | 9/2007 | Chanick |
| 2007/0233291 A1 | 10/2007 | Herde et al. |
| 2007/0244731 A1 | 10/2007 | Bayhydt et al. |
| 2007/0286220 A1 | 12/2007 | Stenning |
| 2008/0022089 A1 | 1/2008 | Leedom |
| 2008/0040172 A1 | 2/2008 | Watkins |
| 2008/0055051 A1 | 3/2008 | Snyder et al. |
| 2008/0071587 A1 | 3/2008 | Granucci et al. |
| 2008/0080445 A1 | 4/2008 | Bayne et al. |
| 2008/0086377 A1 | 4/2008 | Jain |
| 2008/0129487 A1 | 6/2008 | Crucs |
| 2008/0133283 A1 | 6/2008 | Backer et al. |
| 2008/0197984 A1 | 8/2008 | Peters et al. |
| 2008/0201227 A1 | 8/2008 | Bakewell et al. |
| 2008/0215385 A1 | 9/2008 | Veitch |
| 2008/0220871 A1 | 9/2008 | Asher et al. |
| 2008/0246592 A1 | 10/2008 | Waalkes et al. |
| 2008/0267107 A1 | 10/2008 | Rosenberg |
| 2008/0270230 A1 | 10/2008 | Hendrickson et al. |
| 2008/0270305 A1 | 10/2008 | Andreasson et al. |
| 2008/0275630 A1 | 11/2008 | Regienczuk |
| 2008/0301264 A1 | 12/2008 | Mathai et al. |
| 2008/0319935 A1 | 12/2008 | Chandak |
| 2008/0319992 A1 | 12/2008 | Mathai et al. |
| 2009/0063205 A1 | 3/2009 | Shibasaki |
| 2009/0104874 A1 | 4/2009 | Ellis |
| 2009/0112638 A1 | 4/2009 | Kneller et al. |
| 2009/0116235 A1 | 5/2009 | Tsao et al. |
| 2009/0204449 A1 | 8/2009 | Waytena et al. |
| 2009/0216547 A1 | 8/2009 | Canora |
| 2009/0222291 A1 | 9/2009 | Montavon et al. |
| 2009/0259556 A1 | 10/2009 | Carroll et al. |
| 2009/0267728 A1 | 10/2009 | Mayrand |
| 2009/0276341 A1 | 11/2009 | McMahan et al. |
| 2009/0281903 A1 | 11/2009 | Blatstein |
| 2009/0286559 A1 | 11/2009 | Janas et al. |
| 2009/0313062 A1 | 12/2009 | Natsuyama et al. |
| 2009/0319306 A1 | 12/2009 | Chanick |
| 2010/0017238 A1 | 1/2010 | Johnson |
| 2010/0017725 A1 | 1/2010 | McCarthy et al. |
| 2010/0062838 A1 | 3/2010 | Nguyen et al. |
| 2010/0063854 A1 | 3/2010 | Purvis et al. |
| 2010/0111377 A1 | 5/2010 | Monroe |
| 2010/0114968 A1 | 5/2010 | Dean |
| 2010/0161432 A1 | 6/2010 | Kumanov et al. |
| 2010/0250612 A1 | 9/2010 | Reuveni et al. |
| 2010/0262507 A1 | 10/2010 | Woycik et al. |
| 2010/0308964 A1 | 12/2010 | Ackley et al. |
| 2010/0317377 A1 | 12/2010 | Zou et al. |
| 2010/0321149 A1 | 12/2010 | Foster |
| 2010/0328025 A1 | 12/2010 | Razdan |
| 2011/0022425 A1 | 1/2011 | Block et al. |
| 2011/0040655 A1 | 2/2011 | Hendrickson |
| 2011/0133892 A1 | 6/2011 | Nohr |
| 2011/0178960 A1 | 7/2011 | Dever et al. |
| 2011/0227726 A1 | 9/2011 | Lee |
| 2011/0307547 A1 | 12/2011 | Backer et al. |
| 2012/0013462 A1 | 1/2012 | Tuck et al. |
| 2012/0016745 A1 | 1/2012 | Hendrickson |
| 2012/0040751 A1 | 2/2012 | Peters |
| 2012/0116789 A1 | 5/2012 | Boss et al. |
| 2012/0116863 A1 | 5/2012 | Boss et al. |
| 2012/0136793 A1 | 5/2012 | Barber-Mingo et al. |
| 2012/0147169 A1 | 6/2012 | Harper et al. |
| 2012/0184367 A1 | 7/2012 | Parrott et al. |
| 2012/0197746 A1 | 8/2012 | Harris |
| 2012/0197949 A1 | 8/2012 | Taylor et al. |
| 2012/0223834 A1 | 9/2012 | Hyatt |
| 2012/0271834 A1 | 10/2012 | Canora et al. |
| 2012/0287281 A1 | 11/2012 | Williams et al. |
| 2012/0323646 A1 | 12/2012 | Dube et al. |
| 2012/0330740 A1 | 12/2012 | Pennington et al. |
| 2013/0018661 A1 | 1/2013 | Padgett et al. |
| 2013/0018684 A1 | 1/2013 | Padgett et al. |
| 2013/0041696 A1 | 2/2013 | Richard |
| 2013/0045804 A1 | 2/2013 | Ruke |
| 2013/0065679 A1 | 3/2013 | Gelman et al. |
| 2013/0066660 A1 | 3/2013 | Kopitzke et al. |
| 2013/0073325 A1 | 3/2013 | Ross |
| 2013/0090957 A1 | 4/2013 | Popkey et al. |
| 2013/0091146 A1 | 4/2013 | Stanger |
| 2013/0102248 A1 | 4/2013 | Jay et al. |
| 2013/0103519 A1 | 4/2013 | Kountotsis et al. |
| 2013/0124234 A1 | 5/2013 | Nilsson et al. |
| 2013/0146659 A1 | 6/2013 | Zhou et al. |
| 2013/0151296 A1 | 6/2013 | Waytena et al. |
| 2013/0165154 A1 | 6/2013 | Joshi |
| 2013/0204651 A1 | 8/2013 | Gulec et al. |
| 2013/0204656 A1 | 8/2013 | Mahfouda et al. |
| 2013/0218612 A1 | 8/2013 | Hunt |
| 2013/0254027 A1 | 9/2013 | Silverman et al. |
| 2013/0254137 A1 | 9/2013 | Hunt |
| 2013/0293720 A1 | 11/2013 | Tyson et al. |
| 2013/0332208 A1 | 12/2013 | Mehta |
| 2013/0332509 A1 | 12/2013 | Schwartz et al. |
| 2014/0006451 A1 | 1/2014 | Mullis et al. |
| 2014/0046802 A1 | 2/2014 | Hosein et al. |
| 2014/0074404 A1 | 3/2014 | Hassan |
| 2014/0074523 A1 | 3/2014 | Turner et al. |
| 2014/0089075 A1 | 3/2014 | Sanchis et al. |
| 2014/0108149 A1 | 4/2014 | Jabara et al. |
| 2014/0113707 A1 | 4/2014 | Asher et al. |
| 2014/0114807 A1 | 4/2014 | Baker et al. |
| 2014/0132400 A1 | 5/2014 | Heaven et al. |

(56) References Cited

U.S. PATENT DOCUMENTS

| | | |
|---|---|---|
| 2014/0136105 A1 | 5/2014 | Chakraborty et al. |
| 2014/0156290 A1 | 6/2014 | Kozicki et al. |
| 2014/0156319 A1 | 6/2014 | Deeb |
| 2014/0162693 A1 | 6/2014 | Wachter et al. |
| 2014/0235276 A1 | 8/2014 | Lefkowitz |
| 2014/0236653 A1 | 8/2014 | Farrell |
| 2014/0249866 A1 | 9/2014 | Popkey et al. |
| 2014/0249994 A1 | 9/2014 | Proud |
| 2014/0256421 A1 | 9/2014 | Bishop et al. |
| 2014/0256446 A1 | 9/2014 | Barney et al. |
| 2014/0257889 A1 | 9/2014 | Ashley, Jr. et al. |
| 2014/0278688 A1 | 9/2014 | Sullivan et al. |
| 2014/0324488 A1 | 10/2014 | Boccelli |
| 2014/0343976 A1 | 11/2014 | Ahluwalia et al. |
| 2014/0343977 A1 | 11/2014 | Macina |
| 2014/0343995 A1 | 11/2014 | Backer et al. |
| 2014/0364148 A1 | 12/2014 | Block et al. |
| 2014/0378233 A1 | 12/2014 | Weston et al. |
| 2015/0009116 A1 | 1/2015 | Mangold et al. |
| 2015/0025919 A1 | 1/2015 | West |
| 2015/0026008 A1 | 1/2015 | Werbitt |
| 2015/0046202 A1 | 2/2015 | Hunt |
| 2015/0058129 A1 | 2/2015 | Nevid et al. |
| 2015/0058324 A1 | 2/2015 | Kauwe |
| 2015/0080081 A1 | 3/2015 | Kessman et al. |
| 2015/0081348 A1 | 3/2015 | Avera et al. |
| 2015/0083803 A1 | 3/2015 | Herron et al. |
| 2015/0088562 A1 | 3/2015 | Woods |
| 2015/0088671 A1 | 3/2015 | Xiong et al. |
| 2015/0088782 A1 | 3/2015 | Zhang |
| 2015/0090242 A1 | 4/2015 | Weston et al. |
| 2016/0055429 A1 | 2/2016 | Schwartz |
| 2016/0180412 A1 | 6/2016 | DuLeone et al. |
| 2017/0098337 A1* | 4/2017 | Galley ............ G07C 9/29 |
| 2018/0247331 A1 | 2/2018 | D'Andrea |
| 2018/0297486 A1* | 10/2018 | Howard ............ B60M 7/00 |
| 2018/0365600 A1 | 12/2018 | Carrier et al. |
| 2019/0139104 A1 | 9/2019 | Hanley et al. |
| 2019/0272695 A1 | 9/2019 | Schwartz et al. |
| 2019/0347885 A1 | 11/2019 | Galley et al. |
| 2021/0340712 A1* | 11/2021 | Sáenz Löbsack ....... E01B 23/06 |

FOREIGN PATENT DOCUMENTS

| | | |
|---|---|---|
| CN | 201607767 U | 10/2010 |
| CN | 107087434 A | 8/2017 |
| CN | 109890475 A | 6/2019 |
| EP | 0958553 A1 | 11/1999 |
| EP | 1 690 222 A2 | 8/2006 |
| EP | 1 696 327 A1 | 8/2006 |
| JP | 2002032800 A | 1/2002 |
| JP | 2003208495 A | 7/2003 |
| JP | 2004178041 A | 6/2004 |
| WO | WO 9718534 A1 | 5/1997 |
| WO | WO 2003034350 A2 | 4/2003 |
| WO | WO 2004047353 A2 | 6/2004 |
| WO | WO 2005038612 A2 | 4/2005 |
| WO | WO 2005038688 A1 | 4/2005 |
| WO | WO 2005124699 A1 | 12/2005 |
| WO | WO2007004047 A2 | 1/2007 |
| WO | WO 2008128583 A1 | 10/2008 |
| WO | WO 2008144283 A1 | 11/2008 |
| WO | WO 2010089771 A2 | 8/2010 |
| WO | WO20180236209 A2 | 12/2018 |
| WO | 2019090130 A1 | 5/2019 |

OTHER PUBLICATIONS

International Search Report and Written Opinion in corresponding PCT Application No. PCT/US2015/045897 dated Nov. 11, 2015 (11 pages).

International Search Report and Written Opinion in corresponding PCT Application No. PCT/US2013/044785 dated Apr. 30, 2014 (15 pages).

PCT/US2020/039110 International Search Report and Written Opinion dated Oct. 2, 2020.

Putra et al., OBLE-Theme park queuing system using wearable device, Aug. 1, 2017, 2017 IEEE $3^{rd}$ International Conference on Engineering Technologies and Social Sciences, pp. 1-6 (Year: 2017).

EP Office Action for European Application No. 23189872.7 mailed Dec. 14, 2023.

CN Office Action for Chinese Application No. 202080046575.0 mailed Mar. 22, 2024.

\* cited by examiner

SYSTEMS AND METHODS FOR A SMART VIRTUAL QUEUE

CROSS-REFERENCE TO RELATED APPLICATIONS

The present application is a continuation of U.S. patent application Ser. No. 16/714,223, filed on Dec. 13, 2019, which claims the benefit of U.S. Provisional Application No. 62/867,634, entitled "Systems and Methods for a Smart Virtual Queue" and filed Jun. 27, 2019, and the disclosures of which are incorporated herein by reference for all purposes.

BACKGROUND

The present disclosure relates generally to the field of amusement parks. Specifically, embodiments of the present disclosure are related to techniques for managing reduced capacity events in a virtual queue.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Theme park or amusement park attractions have become increasingly popular, and various amusement park attractions have been created to provide passengers with unique motion and visual experiences. Guests entering the various amusement park attractions may utilize a virtual queuing system that places the guests in a virtual queue rather than a physical queue, which allows the guests to enjoy other features of the amusement park while their position in the virtual queue advances. However, amusement park attraction downtimes or partial closures may affect actual loading times at the amusement park attraction, causing guests to have to wait for extensive periods of time in loading lines at the amusement park, negating some of the benefits of having the virtual queue. Accordingly, it is now recognizable that it is desirable to improve virtual queue system during reduced capacity events (e.g., park attraction downtimes or partial closures).

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with an embodiment, a system includes a virtual queue controller having a processor and a memory. The processor is configured to execute instructions accessed from the memory to cause the virtual queue controller to receive an indication of a reduced capacity event from an amusement park attraction, determine a reduction in capacity of the attraction associated with the reduced capacity event, identify each guest having a return time in a virtual queue of the attraction that is affected by the reduced capacity event based on the reduction in capacity, remove guests having affected return times from the virtual queue, and generate a reaccommodation time slot for the guests removed from the virtual queue. A length of the reaccommodation time slot is based on a total number of affected return times of the guests removed from the virtual queue. The reaccommodation time slot is subsequent to all of the affected return times. The processor is also configured to execute instructions accessed from the memory to cause the virtual queue controller to select two or more updated return times within the reaccommodation time slot for each of the guests removed from the virtual queue, provide a notification to each guest removed from the virtual queue requesting guest input to select a single updated return time from the two or more updated return times, and return each guest to the virtual queue upon receiving a corresponding selection of the single updated return time.

In accordance with an embodiment, a virtual queue system having an amusement park attraction comprising a capacity based on a number of available guest seats and a virtual queue controller having a processor and a memory. The virtual queue controller is configured to output a notification to reduce guest admittance to the amusement park attraction from a virtual queue based at least in part on a reduced capacity event associated with a reduction in the number of the available guests seats during the reduced capacity event, identify guests having affected return times in the virtual queue, wherein the affected return times are associated with return times to the amusement park attraction during the reduced capacity event, remove at least one guest having one of the affected return times from the virtual queue, generate a reaccommodation space in the virtual queue, provide a guest notification to a guest-associated device associated with the at least one guest removed from the virtual queue, the guest notification indicating removal from the virtual queue and a plurality of new return times corresponding to the reaccommodation space, receive a selection notification of a selection of one new return time of the plurality of new return times by the guest via the guest-associated device, and validate the selected new return time when presented for entry at or later than the new return time. The virtual queue system also includes a sensor assembly positioned at an entrance of the amusement park attraction and configured to receive information from the guest-associated device and send the information from the guest associated device to the virtual queue controller for validating.

In accordance with an embodiment, a method includes the steps of receiving an indication of a reduced capacity event, determining a reduction in guest throughput for an amusement park attraction during the reduced capacity event, determining, based on the reduction in guest throughput, a total number of virtual queue return times for guests in a virtual queue affected by the reduced capacity event, identifying each individual guest with an affected virtual queue return time, generating a reaccommodation time slot in the virtual queue, wherein a size of the reaccommodation time slot is based on the total number of virtual queue return times for guests in the virtual queue affected by the reduced capacity event, and providing notifications to each of the individual guests with affected virtual queue return times indicating a plurality of available new return times in the reaccommodation time slot.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
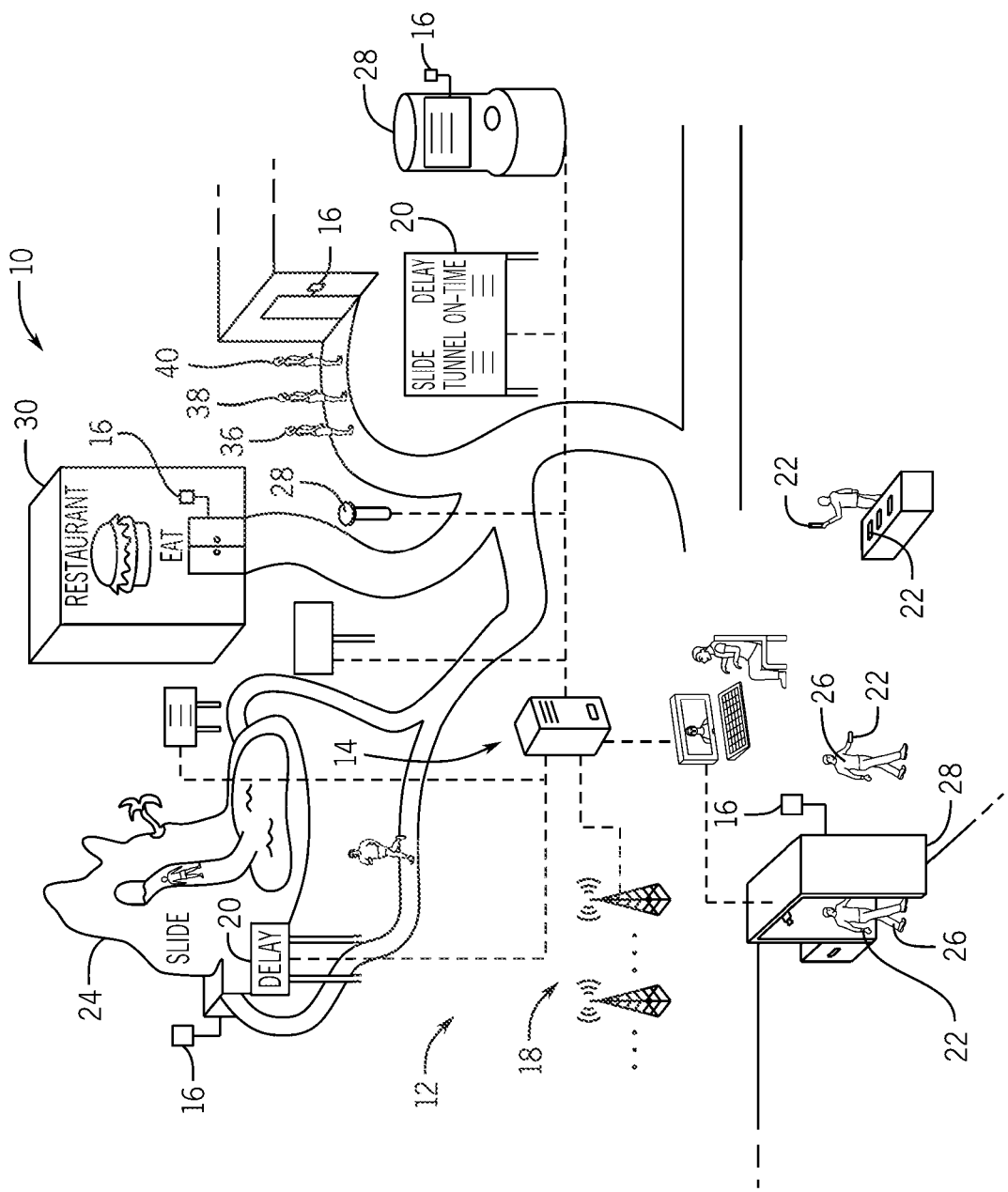
FIG. 1 is a schematic view of an embodiment of an amusement park including a virtual queue system, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Theme park or amusement park attractions have become increasingly popular, and various amusement park attractions have been created to provide passengers with unique motion and visual experiences. Guests entering the various amusement park attractions may utilize a virtual queuing system that places the guests in a virtual queue rather than a physical queue, which allows the guests to enjoy other features of the amusement park while their position in the virtual queue advances. Certain virtual queue systems provide a return time to the guests indicating a time for the guests to arrive at the amusement park attraction. Guests are directed to return, at the return time, to the amusement park attraction to wait in a limited length physical queue or loading line before entering the amusement park attraction (e.g., boarding a ride vehicle of the amusement park attraction). It should be understood that the loading line may also refer to a loading group of guests assembled in the loading area who may or may not be in a first-in-first-out arrangement. Accordingly, a loading line, as provided herein, may refer to the limited number of guests assembled in the loading area. Generally, the loading area or limited length physical queue or loading line functions as a buffer for the amusement park attraction and has enough guests so that a sufficient amount of guests are present to fill the amusement park attraction to full capacity at a loading time for the amusement park attraction. However, the limited length loading line may also be short in length to reduce an amount of time that the guests need to spend in the loading line so that guests have more time to enjoy other aspects of the amusement park (e.g., dining, shopping, and other entertainment venues). Virtual queueing systems may allow a predetermined number of guests to arrive at the attraction leading area such that the loading line may be short in length, but also have sufficient number of guests to fill the amusement.

Unfortunately, reduced capacity events (e.g., amusement park attraction downtimes and/or partial attraction closures) may prevent the amusement park attraction from running at full capacity. During a reduced capacity event, more guests may be entering the loading line (e.g., arriving from the virtual queue at or later than their return time) than leaving the loading line (e.g., by boarding the amusement park attraction). This may cause delays for guests present in the loading line. Having more guests enter the loading line than leaving the loading line causes the loading line to increase in length, which causes guests to wait for extended periods of time in the loading line after returning to the amusement park attraction at or after their return time. Having to wait in the loading line for extended periods of time may inconvenience and/or frustrate guests and eliminates some of the benefits of providing a virtual queue.

Further, extended periods of time in the loading line due to the delays caused by the reduced capacity event may have additional adverse effects on overall amusement park efficiency. Based on a guest's return time, the guest may expect to exit the ride at a particular time and make plans accordingly (e.g., lunch plans with family, queue for a subsequent amusement park attractions). However, extended periods of time in the loading line may delay the expected exit time for the guest, which may create conflicts with the guest's plans. As such, loading line delays may cause guests to arrive late or fail to show up for a virtual queue return time for the subsequent amusement park attraction in the amusement park, causing delays and/or reduced efficiency for the subsequent amusement park attraction. Further, the loading line delays may cause the guest to miss dining plans with family in order to remain in the queue during the reduced capacity event, which may further inconvenience and/or frustrate the guest.

With this in mind, provided herein is a system and method for managing the virtual queue system during a reduced capacity event that helps maintain a desirable length of the loading line to prevent or reduce the adverse effects associated with reduced capacity events on both the guests and the amusement park.

FIG. 1 is a schematic view of an embodiment of an amusement park 10 including a virtual queue system 12. The virtual queue system 12 includes a computer system 14, monitoring sensors 16, and a wireless communication system 18, system displays 20, guest-associated devices 22 (e.g., an active wearable guest device, a guest mobile device, etc.) and other components that coordinate operation of respective virtual queues for amusement park attractions 24 in the amusement park 10. As set forth above, guests 26 entering the various amusement park attractions may utilize the virtual queue system 12 to enter a virtual queue rather than a physical queue for an amusement park attraction 24.

In an embodiment, the guests 26 may use the guest-associated devices 22 to submit a virtual queue request to enter the virtual queue for the amusement park attraction 24. In other embodiments, the guests 26 may enter the virtual queue request via kiosks 28 disposed around the amusement park 10. In an embodiment, the kiosks 28 are disposed proximate the amusement park attractions 24. In other embodiments, the kiosks 28 are disposed in general areas of the amusement park (e.g., dining area 30).

The virtual queue requests may be received by the virtual queue system 12 via communications circuitry of the wireless communication system 18. Based on the virtual queue request, the virtual queue system 12 may enter the guest 26 into the virtual queue for the amusement park attraction 24 and provide the guest 26 with a return time or a dynamic position in the virtual queue that advances as guests enter the attraction 24. For example, the virtual queue system 12 may have available time slots at 1:45 pm, 2:00 pm, and 2:15 pm for an amusement park attraction. Using the guest-associated device 22, the guest 26 may send a virtual queue request for a 2:00 return time. In response, the virtual queue system 12 may enter the guest 26 into the virtual queue and provide the guest 26 with a notification to return to an amusement park attraction 24 at 2:00 pm.

In an embodiment, guests may select from a group of available return times at their own discretion, with some guests choosing later return times based on their own itinerary for the day. That is, the virtual queue controller may permit the first guest 36 to select a return time of 2:00 pm, the second guest 38 to select a return time of 2:05 pm, and the third guest 40 to select a return time of 2:10 pm. The available return times at each time slot may be preset at the beginning of the day and may be distributed to guest until they are no longer available.

In an embodiment, the virtual queue system 12 may incorporate other methods for determining and providing return times or queue positions to guests 26. In an embodiment, the guest returns to an attraction based on a position of the guest 26 in the virtual queue. In response to a virtual queue request, the virtual queue system 12 may place the guest 26 in the virtual queue and add the guest 26 to an available position in the virtual queue relative to other guests. For example, a first guest 36, a second guest 38, and a third guest 40 may send respective first, second, and third virtual queue requests. The first guest 36 may be assigned to a first position in the virtual queue, the second guest 38 may be assigned to a second position in the virtual queue, and the third guest 40 may be assigned to a third position in the virtual queue. The guests may return to the attraction at a time when their position in the virtual queue is at the top of the virtual queue. In an embodiment, the system 12 may provide estimates of an expected time until the guests reaches the top of the virtual queue, and the estimate may serve as a return time as provided herein.

The guest may return to the attraction 24 at or after their return time. In an embodiment, the sensor 16 is implemented as a wireless reader, e.g., an NFC reader, and is capable of communicating with the guest-associated device 22 to validate the return time of the guest associated with the guest-associated device and, based on the communication, an indication of a valid return time (e.g., a green light, a valid notification pushed to guest-associated device 22) may be provided based on a determination that the current time is at or later than the indicated return time. An invalid return time indication (e.g., a red light, an invalid notification pushed to guest-associated device 22) may be provided when the guest attempts to enter the attraction 24 at a time before the return time. While the sensor 16 may be configured to perform a communication with the guest-associated device 22, the determination of valid or invalid return times may be performed by a virtual queue controller 42 communicatively coupled to the sensor 16 as provided herein.

Figure 2:
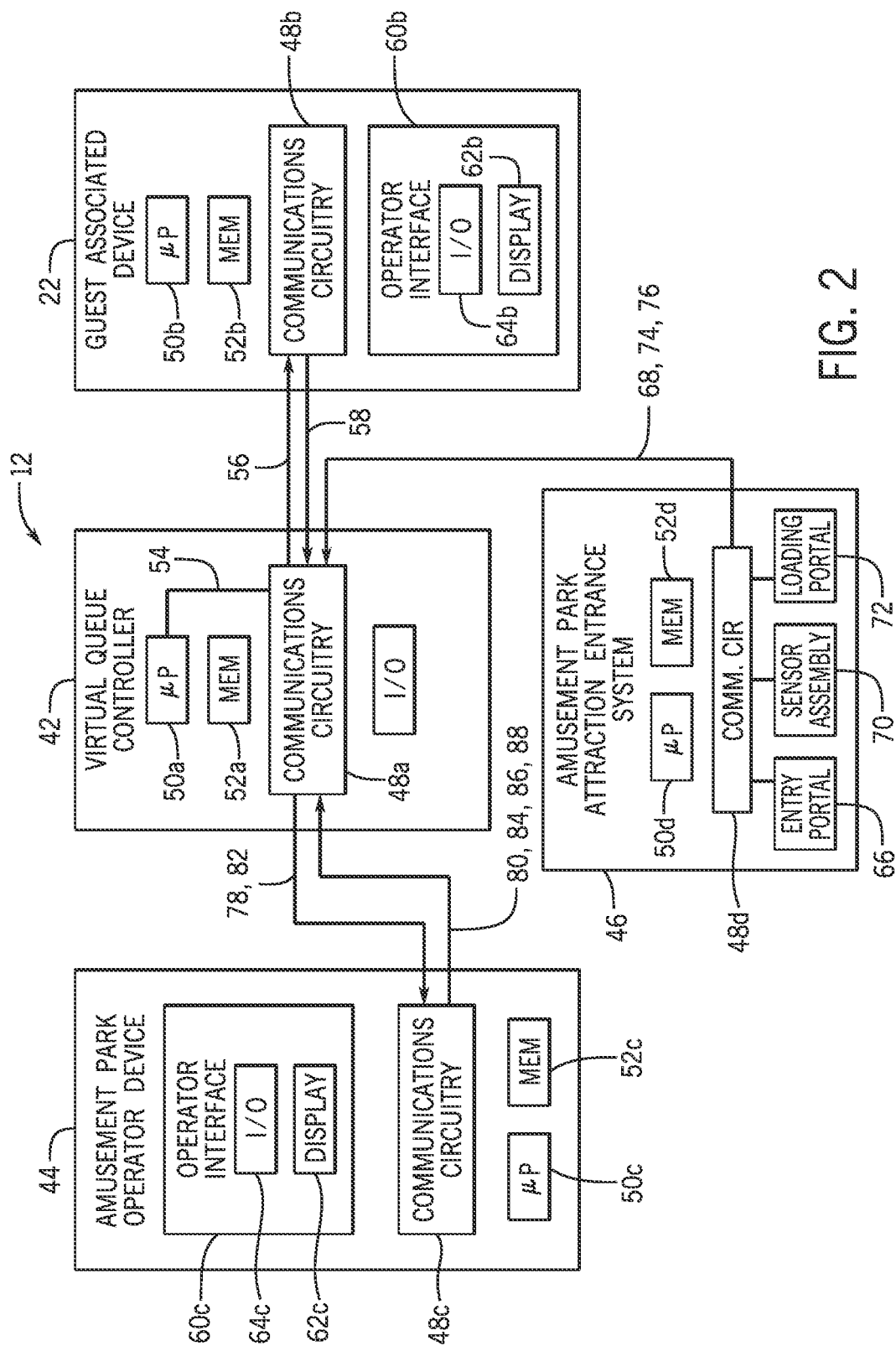
FIG. 2 is a block diagram of an embodiment of the virtual queue system, in accordance with an aspect of the present disclosure.

FIG. 2 is a block diagram of an embodiment of the virtual queue system 12. The virtual queue system 12 includes a virtual queue controller 42 configured to manage the virtual queue. The virtual queue controller 42 may be configured to communicate with other components of the virtual queue system 12, including the guest associated device 22, an amusement park operator device 44, and amusement park attraction entrance system 46, or some combination thereof. Each of the components of the virtual queue system 12 may include communication circuitry 48a, 48b, 48c, and 48d to communicate with other components of the virtual queue system 12. For example, the virtual queue controller 42 may include communications circuitry 48a. The communication circuitry may include antennas, radio transceiver circuits, and signal processing hardware and/or software (e.g., hardware or software filters, A/D converters, multiplexers amplifiers), or a combination thereof, and that may be configured to communicate over wireless communication paths via Infrared (IR) wireless communication, satellite communication, broadcast radio, Microwave radio, Bluetooth, Zigbee, Wifi, UHF, NFC, etc. In one embodiments, the communication circuitry 48a, 48b, 48c, and 48d includes a plurality of IR transceivers disposed in the environment of the amusement park attraction.

The virtual queue controller 42 may include a processor 50a and a memory 52a. The processor 50a may include one or more processing devices, and the memory 52a may include one or more tangible, non-transitory, machine-readable media. By way of example, such machine-readable media can include RAM, ROM, EPROM, EEPROM, or optical disk storage, magnetic disk storage or other magnetic storage devices, or any other medium which can be used to carry or store desired program code in the form of machine-executable instructions or data structures and which can be accessed by the processor 50a or by other processor-based devices (e.g., mobile devices). In an embodiment, the memory 52a is configured to store instructions executable by the processor 50a to output various control system signals 54. For example, the processor 50a may execute instructions to place the guest in the virtual queue and output a notification 56, via the communications circuitry 48a, to the guest associated device 22 indicating the return time based on the virtual queue request 58 from the guest associated device 22 and instructions stored on the memory 52a.

As set forth above, the virtual queue controller 42 is configured to output notifications 56 for the guests to the respective guest associated devices 22. For example, the notifications 56 may direct the guests to return to an amusement park attraction at a specified return time. In another example, the notification 56 may include a delay message. In an embodiment, the virtual queue controller 42 is configured to identify guests in the virtual queue affected by a reduced capacity event for the amusement park attraction and output the delay message to guests with affected virtual queue return times. The guest-associated device 22 may be a personal guest device (e.g., smart phone, tablet, laptop, etc.) or a park queue device provided to guests (e.g., smart wrist bands, active wearables, portable communication devices, etc.). The guest-associated device 22 may have a processor 50b and a memory 52b. Further, the guest-associated device 22 may include an operator interface 60b with a display 62b (e.g., screen) and an input device 64*b* (e.g., touch screen, keypad, keyboard, etc.). The guest-associated device 22 may be configured to show the notification 56 on the display 62*b*. In an embodiment, the guest may responds to the notification 56 via the input device 64*b*. For example, the guest may confirm a return time via the input device 64*b*.

In an embodiment, the notifications 56 may direct the guests to return to the amusement park attraction to enter the loading line at their return time. At their respective return times, guests may enter the loading line through an entry portal 66 of an amusement park attraction entry system. The entry portal 66 may be configured to detect that a guest has entered the loading line. The amusement park attraction entry system 46 may include a processor 50*d* and a memory 52*d*. The processor 52*d* may be configured to execute instructions to output a counter signal 68, via the communications circuitry 48*d*, to the virtual queue controller 42 indicating that the guest has entered the loading area based at least in part on the detection of the guest and instructions stored on the memory device. In an embodiment, the entry portal 66 is configured to output the counter signal 68 directly to the virtual queue controller 42. In an embodiment, the entry portal 66 comprises a sensor assembly 70 (e.g., that includes the sensor 16) configured to detect the guest-associated device 22. The virtual queue controller 42 may be configured to determine that a guest has entered the loading line based at least in part on detection of the guest-associated device 22 at the entry portal 66. In an embodiment, the entry portal 66 also verifies that the guests have a valid return time at the time of entry through the entry portal 66. The virtual queue system 12 may determine a number of guests entering the loading line based on the counter signals 68 received from the amusement park attraction entrance system 46 and/or entry portal 66. In an embodiment, the amusement park attraction may comprises a turnstile configured to output the counter signal 68 to the amusement park attraction for each guest that passes through the turnstile.

The amusement park attraction entrance system may also include a loading portal 72 configured to detect guests leaving the loading line (e.g., entering the amusement park attraction). The amusement park attraction entrance system 46 and/or loading portal 72 may be configured to output a second counter signal 74 to the virtual queue controller 42 indicating detection of guests leaving the loading line. The virtual queue controller 42 may be configured to determine a total number of guests in the loading line based on second counter signal 74. In an embodiment, a loading line area may include the sensor assembly 70 of the amusement park attraction entrance system 46. The sensor assembly 70 may have a plurality of sensors configured to detect each guest device in the loading line and output a total guest count signal 76 to the virtual queue controller 42. The virtual queue controller 42 may be configured to determine a total number of guests in the loading line based at least in part on the total guest count signal 76.

As provided herein, the virtual queue controller 42 is configured to manage a virtual queue of an attraction and to remove one or more guests from the virtual queue in response to a reduced capacity event. While the indication of the reduced capacity event may be based on a signal received from an attraction operator, the virtual queue controller 42 may also be configured to identify reduced capacity events based on queue information. In an embodiment, the virtual queue controller 42 is configured to determine that the amusement park attraction is experiencing a potential reduced capacity event based at least in part on the total number of guests in the loading line exceeding pre-determined threshold or tolerance. In response to determining that the amusement park attraction is experiencing a potential reduced capacity event, the virtual queue controller 42 may output a reduced capacity notification 78 to the amusement park operator device 44 indicating that the amusement park attraction may be experiencing a reduced capacity event. The amusement park operator device 44 may be a computer, smart phone, tablet, laptop, etc. The amusement park operator device 44 may have a processor 50*c* and a memory 52*c*. Further, the amusement park operator device may include an operator interface 60*c* with a display 62*c* (e.g., screen) and an input device 64*c* (e.g., touch screen, keypad, keyboard, etc.). The amusement park operator device 44 may be configured to show the reduced capacity notification 78 on the display 62*c*. The reduced capacity notification 78 may indicate to the operator that the amusement park attraction is experiencing a potential reduced capacity event. The reduced capacity notification 78 may include data for the operator to determine if the amusement park attraction is experiencing a reduced capacity event and to determine a severity and/or duration of the reduced capacity event. The reduced capacity notification 78 may also include a prompt to input, via the input device 64*c*, an operator response 80 (e.g., Confirmation or rejection of a reduced capacity event). In an embodiment, in response to receiving a confirmation of the reduced capacity event, the virtual queue controller 42 may send an instructions request 82 with a prompt requesting that the operator provide operator inputs 84 related to the severity and/or duration of the reduced capacity event.

In an embodiment, the operator may manually output a reduced capacity event signal 86 to the virtual queue controller 42 via the operator interface 60*c*. For example, a ride vehicle of the amusement park attraction may require maintenance. The operator may direct the ride vehicle from the main track to a service track of the amusement park attraction. Without the ride vehicle on the main track, the amusement park attraction may not have enough ride vehicles to operate at full capacity. The operator may manually output the reduced capacity event signal 86 indicating that the amusement park attraction is operating below full capacity. The reduced capacity event signal 86 may include data indicating an amount of reduced capacity, an expected duration of the reduced capacity, etc. In an embodiment, the operator may output the reduced capacity event signal 86 for other reasons, including food spills, weather delays, full system maintenance (e.g., shutdown), etc. Moreover, the operator may manually output an end reduced capacity event signal 88 indicating that the amusement park attraction is operating at full capacity.

In an embodiment, the reduced capacity may be a function of a total reduced available sets per ride cycle, whereby the ride cycle is an average time of the ride run (e.g., two minutes, five minutes). For example, if a single ride vehicle having six seats is nonoperational, the reduced capacity may be six seats per ride cycle. If the ride normally has 120 seats at full capacity across all ride vehicles and operates on average 10 times per hour (1200 guests per hour), a loss of six seats is a 6% reduction in ride capacity or a loss of 72 seats per hour. Similarly, if a single seat of a ride vehicle is nonoperational due to a food spill, the reduced capacity may be a single seat per ride cycle.

In an embodiment, the virtual queue controller 42 is configured to determine that the amusement park attraction is experiencing a reduced capacity event based at least in part on reception of confirmation of the reduced capacity event or the reduced capacity event signal 86 from the amusement park operator device 44.

Figure 3:
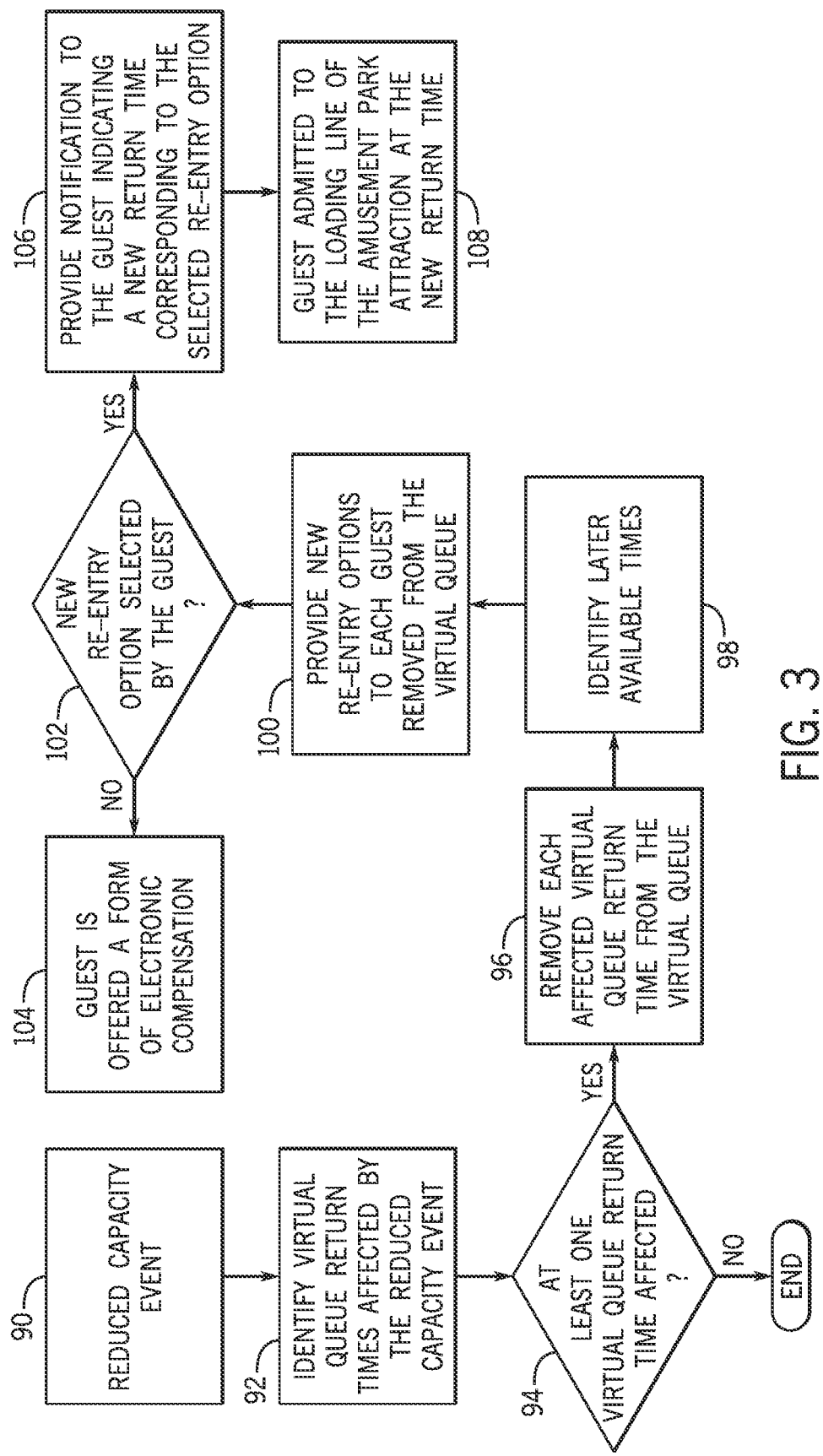
FIG. 3 is a flow diagram of an embodiment of virtual queue system techniques during a reduced capacity event, in accordance with an aspect of the present disclosure.

FIG. 3 is a flow diagram of an embodiment of the virtual queue system during a reduced capacity event (block 90). The reduced capacity event may include a partial shutdown of the amusement park attraction. For example, the partial shutdown may include shutting down at least one ride vehicle, ride seat, or some combination thereof of the amusement park attraction. During a partial shutdown, the amusement park attraction is configured to operate at a percentage greater than 0% and less than 100% of full ride capacity. In an embodiment, the virtual controller is configured to output a notification to reduce guest admittance to an amusement park attraction from a virtual queue based at least in part on the reduced capacity event. Moreover, the reduced capacity event may also include a downtime event for the amusement park attraction. The downtime event may include a full shutdown of the amusement park attraction, such that operation of the amusement park attraction ceases during the downtime event. Specifically, the amusement park is configured to operate at 0% of full ride capacity during the downtime event.

Based on the percentage of reduction in ride capacity of the amusement park attraction during the reduced capacity event, the loading line may begin to increase in length as the amount of guests entering the loading line will likely exceed the amount of guests leaving the loading line (e.g., entering the amusement park attraction) because of the reduction in ride capacity of the amusement park attraction. To avoid excessive wait times in the loading line, the virtual queue system may be configured to reduce guest admittance into the loading line of the amusement park attraction.

In an embodiment, to reduce guest admittance into the loading line, the virtual queue controller is configured to identify queue return times affected by the reduced capacity event (block 92). For example, a guest having a return time during a downtime event would be affected by the reduced capacity event as the guest would hypothetically experience additional time in the loading line during the downtime event. In another example, guests with return times immediately subsequent the reduced capacity event may be affected by the reduced capacity event as the loading line may be longer than the pre-determined length causing the guest to have to wait in the loading line for an extensive period of time.

In an embodiment, wherein the guests are provided an estimated return time as a notification or a reminder (e.g., output to a guest-associated device 22) based on a particular position in the virtual queue that dynamically advances as the guests in front enter the attraction, the virtual queue controller may be configured to identify affected positions in the virtual queue, which correspond to estimated return times affected by the reduced capacity event. The virtual queue controller may be configured to identify guests affected by the reduced capacity event based on the affected return times and/or the affected positions (and their associated affected estimated return times) in the virtual queue.

Following some reduced capacity events, the virtual queue controller may determine that no return times were affected by the reduced capacity event. That is, the virtual queue controller may fail to identify any guests with return times affected by the reduced capacity event. In such cases, the virtual queue controller takes no further action in response to the reduced capacity event. However, in some cases, the virtual queue controller may determine that at least one return time is affected by the reduced capacity event (block 94). Instead of having the guests with an affected return times in the virtual queue sit in the loading line for an extended period of time, the virtual queue controller may be configured to remove the affected return times or guests with affected return times from the virtual queue (block 96). The virtual queue controller may be configured to store in the memory device data indicating which guests or return times were removed from the virtual queue.

In an embodiment, the virtual queue controller 42 may trigger removal of certain affected guests from the virtual queue based on both a threshold of a loss of capacity (e.g., greater than 10%) and a presence of a threshold number of return times (e.g., more than 75 at a given return time, more than 200 return times that mature during the course of an hour) during the reduced capacity event. Accordingly, a given reduced capacity event may result in removal of all or only some of the guests from the virtual queue within a time window associated with the reduced capacity event.

The virtual queue controller 42 may be configured to achieve a predetermined relationship between return times for a particular time window and ride capacity. That is, the return times that mature or become valid starting at times within the time window may be considered to be associated with that time window. In one example, the virtual queue controller 42 may be configured to keep the number of return times that mature or are valid within a particular hour to be less than a particular percentage of total capacity for that hour. In one example, a target percentage of return times relative to the total capacity is 50% or less, 35% or less, 25% or less. When a reduction in capacity alters the percentage relationship, the virtual queue controller 42 is configured to remove guests from the virtual queue during the time window in question until the desired relationship is reestablished. For example, for a target of 50%, a ride has 1200 guests per hour and the return times maturing in a particular hour are about 600 guests. However, if five ride vehicles are removed from operation for a total of 30 seats reduced capacity per ride cycle, a total ride capacity is diminished by 300 seats per hour if a ride cycle occurs 10 times per hour. In such an example, the 600 return times for the hour would then represent more than 50% of capacity. Accordingly, the virtual queue controller 42 may remove guests from the virtual queue during the time window until the 50% relationship is reestablished. Further, if the system 12 has additional return times in inventory for the time of the reduced capacity event with an excess number of mature return times, these return times may be removed from inventory to prevent additional guests from obtaining return times during the reduced capacity event. In the provided example, at least 100 guests are removed to reestablish the relationship. This group of 100 represents only a subgroup of the total of 600 maturing return times. The present techniques permit more granular adjustment of incoming guests relative to ride capacity and more targeted changes to return times that can be addressed only to affected guests without being visible to the total population of guests. As discussed herein, removal may also be associated with an offer of available reaccommodation at a later time in the day.

In another example, if the reduced capacity is diminished by 300 seats per hour, but the number of outstanding return times for the hour is only 200, then the relationship is maintained at less than 50% and reduced capacity event may not trigger any removal of guests from the virtual queue. However, a number of new return times during the hour that are available for additional guests may be readjusted or removed from inventory to account for the reduced capacity event.

The removal of guests from the virtual queue in response to the reduced capacity event may be performed in a last-in first-out manner. That is, the guests with the most-recently distributed return times may be removed from the virtual queue before guests having return times selected at earlier points in the day. In another example, the removal of guests from the virtual queue in response to the reduced capacity event may factor in group size, retaining larger groups while removing smaller groups or vice versa. In another example, the removal of guests from the virtual queue in response to the reduced capacity event may factor in a guest status (e.g., a VIP status) and avoiding removing guests of higher status. The guest status (e.g., VIP status) may be based at least in part on whether the guest is an Express Pass purchaser, an annual pass holder, a resort guest, or a multi-park ticket holder. In another example, the removal of guests from the virtual queue in response to the reduced capacity event may factor in ride history. Guests having ridden the amusement park attraction earlier in the day may be removed. Further, guests that have never ridden the amusement park attraction may be given priority over other guests (e.g., first time riders). Moreover, the virtual queue system may factor in whether the guest is in a virtual queue for another attraction, a type or brand of the guest device 22 associated with the guest, a location of the guest in the park (e.g., distance of the guest from the amusement park attraction), whether the guest is located in the park, or other factors in determining the removal of guests from the virtual queue in response to the reduced capacity event. In some embodiments, the virtual queue system may determine the removal of guests from the virtual queue in response to the reduced capacity event based on one or more of the factors set forth above.

The virtual queue controller is configured to generate and/or identify later available times for the guests removed from the virtual queue and generate a reaccommodation time slot in the virtual queue based on the later available times (block 98) for guests removed from the virtual queue. The reaccommodation time slot or the reaccommodation space is configured to provide new return times or options for the guests removed from the virtual queue (block 100). The reaccommodation time slot may be configured to start immediately following an end of the reduced capacity event. For example, a first new return time may be scheduled for 2:00 pm following a reduced capacity event ending at 2:00 pm. In an embodiment, the reaccommodation time slot may begin during the reduced capacity event. For example, during a prolonged partial shutdown (e.g., operating at 80% ride capacity for multiple hours), the reaccommodation time slot may begin twenty minutes after the start of the prolonged partial shutdown. In an embodiment, the reaccommodation time slot may include a sufficient amount of new return times to accommodate each guest removed from the virtual queue. The reaccommodation time slot may have new return times at different times to allow guests flexibility in obtaining a new return time that is compatible with guests' schedules. For example, the return time slot may have new return times at 2:00 pm, 2:15 pm, 2:30 pm, and 2:45 pm.

The virtual queue controller may be configured to output the delay message to the guest associated devices corresponding to the guests removed from the virtual queue. The delay message may include a message indicating that a reduced capacity event has occurred. The delay message may also indicate to the guests that they have been removed from the virtual queue. Further, the delay message may be configured to prompt the guest to select a re-entry option (e.g., new return time) for the virtual queue of the amusement park attraction. Re-entry options may correspond to a new return time in the reaccommodation time slot. The guests may select one of the return or re-entry options via the input device of the guest associated device (block 102). For example, the guest may have an active wearable. The active wearable may display the delay message on the display (e.g., screen) of the active wearable. The delay message may provide the guest with re-entry options including new return times at 2:00 pm, 2:15 pm, or at 2:30 pm. The guest may, using the input device, select the 2:00 pm return time and confirm selection of the new return time at 2:00 pm. In another, example, the new return times may not be convenient for the guest. The delay message may further include a re-entry option to reject the new return times. If the guest rejects the new return times, the virtual queue system may offer the guest a form of electronic compensation (e.g., prioritized queue placement for another attraction) for removing the guest from the virtual queue (block 104). Moreover, the guest associated device is configured to output the re-entry option (e.g., selection, confirmation, or a rejection of the new return times) from the guest associated device to the virtual queue controller. In some embodiments, the reaccommodation time slot may not may not have sufficient new return times for each guest removed from the virtual queue. That is, the total number of guests removed from the virtual queue may be greater than the total number of new return times for the guests removed from the virtual queue. Thus, some guests may not be re-accommodated. The virtual queue system may offer electronic compensation for the guests that are not re-accommodated.

The virtual queue controller is configured to provide a notification to the guest associated device indicating a new return time in the reaccommodation space corresponding to the selected or confirmed new return time (block 106). The guest associated device may provide the notification to the guest via the display of the guest associated device. In an embodiment, the notification includes a verification (e.g., code, scannable indicia, signal output, etc.) for the guest to present at the entrance of the amusement park attraction. Using the verification, the guest may be admitted to the loading line of the amusement park attraction at the new return time (block 108).

Figure 4:
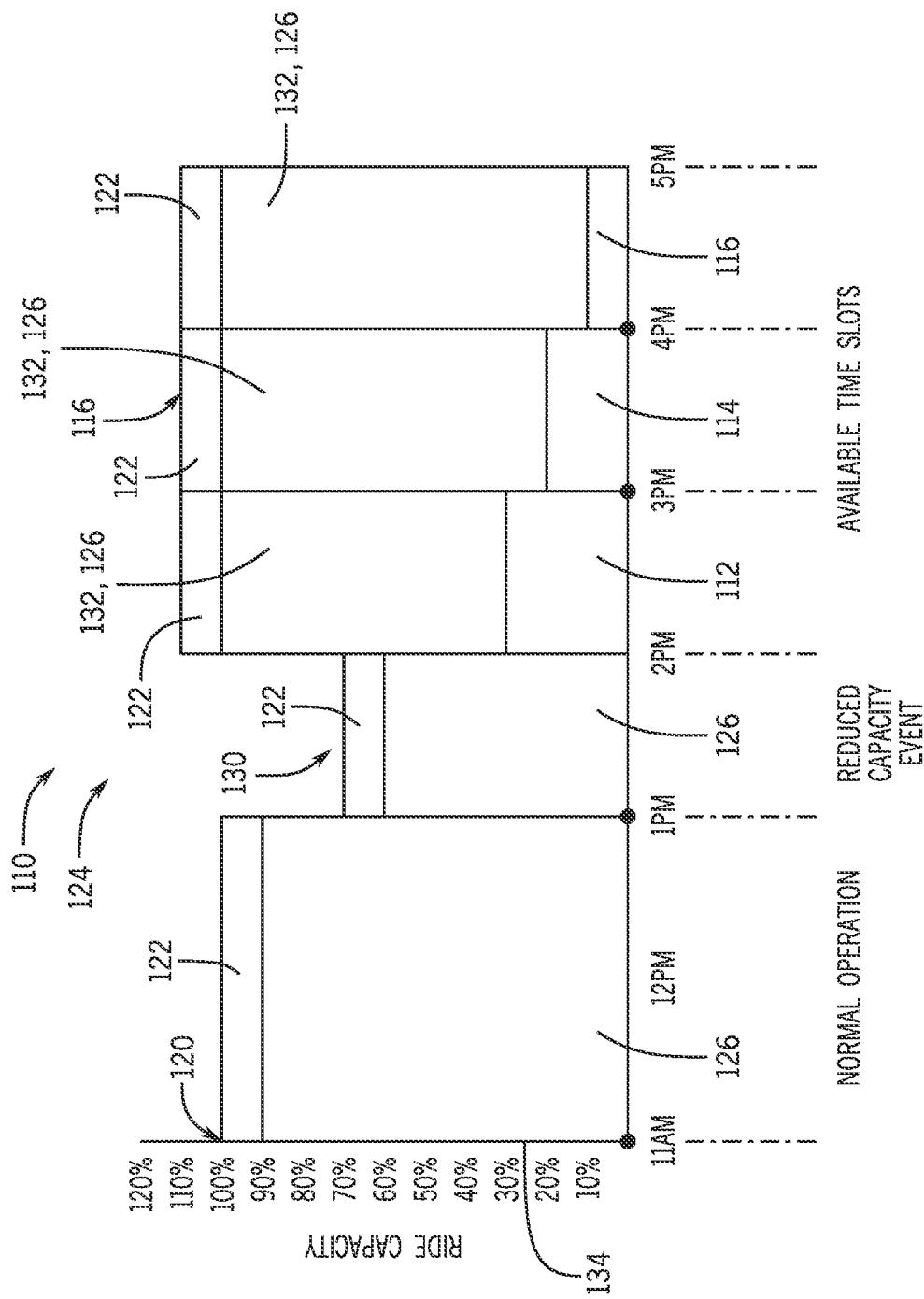
FIG. 4 is a graph of an embodiment of the virtual queue system for an amusement park attraction, in accordance with an aspect of the present disclosure.

FIG. 4 is a graph of an embodiment of the virtual queue system for an amusement park attraction. The graph 110 includes the reduced capacity event and reaccommodation time slots 112, 114, 116. In an embodiment, the reaccommodation time slot 112 is configured to start after the reduced capacity event. In the illustrated embodiment, the reaccommodation time slot 112 begins immediately following the reduced capacity event. The reaccommodation time slot 112 includes new return times within the reaccommodation time slot 112. For example, in the illustrated embodiment, the reaccommodation time slot 112 is configured to start at 2:00 pm and end at 3:00 pm. Thus, the new return times may be at 2:00 pm, 2:15 pm, 2:30 pm, and 2:45 pm. The new return times may occur at any suitable increment based on the corresponding amusement park attraction.

In an embodiment, the duration of the reaccommodation time slot is based on a total number of affected virtual queue return times 114 removed from the virtual queue. That is, the reaccommodation time slot 112 may have a variable size based at least in part on a total number of guests removed from the virtual queue. For example, in the illustrated embodiment, the reduced capacity event may have been a partial attraction closure event 130 (e.g., one or more ride vehicles of the amusement park attraction moved for maintenance) from 1:00 pm to 2:00 pm that reduced the ride throughput by 30%. Thus, at least 30% of guests having return times from 1:00 pm to 2:00 pm were affected by the reduced capacity event and removed from the virtual queue. The remaining 70% of guests (e.g., unaffected guests 132) may retain their return time in the virtual queue during the reduced capacity event. In this example, the amusement park attraction may have a guest throughput of 600 guests per hour. Thus, the virtual queue controller may remove 180 guests from the virtual queue during the reduced capacity event. In an embodiment, the reaccommodation time slot 112 is configured to accommodate all of the guests removed from the virtual queue in a time frame immediately following the reduced capacity event. Thus, the reaccommodation slot may start at 2:00 pm and last until 2:18 pm (e.g., 18 minutes) to accommodate all 180 guests in the reaccommodation time slot 112. However, in an embodiment, the reaccommodation slot 112 occurs over an extended time frame to minimize disruptions for guests having return times in the virtual queue immediately following the reduced capacity event. For example, in the illustrated embodiment, the reaccommodation time slot 112 starts at 2:00 pm and lasts until 3:00 pm.

In an embodiment, at least some guests having return times during the reaccommodation time slot 112 may be removed from the virtual queue 124 to generate sufficient space for the reaccommodation time slot 112. These guests are provided re-entry options that include new return times in a second reaccommodation time slot 114. Further, at least some guests having return times during the second reaccommodation time slot 114 may also be removed from the virtual queue and provided re-entry options that include new return times in a third reaccommodation time slot 116. In another embodiment, the virtual queue system is configured to remove all guests from the virtual queue after a reduced capacity event. Each guest removed from the virtual queue may be provided re-entry options. However, guests having earlier return times, before being removed from the virtual queue, may be given priority in selecting re-entry options. For example, a guest having an original return time at 2:00 pm would be given priority over a guest having an original return time at 2:30 pm. In an embodiment, re-entry options provided to the guests may be limited based on their respective return time before being removed from the virtual queue.

In an embodiment, the virtual queue controller is configured to determine an amount of predicted no-shows 122 for the amusement park attraction. For example, the virtual queue controller may determine that 9% of the guests will fail to arrive at their respective return times (e.g., predicted no-shows 122). Thus, only 91% of guests may be predicted to arrive at their respective return times (e.g., predicted arrivals 126). The virtual queue controller may be configured to determine the amount of predicted no-shows 122 based at least in part on historical data and current virtual queue data. The virtual queue controller may consider time of day, date, weather patterns, special events, past queue data, current queue data, and other suitable factors when determining the amount of predicted no-shows 122 for the amusement park attraction.

Generally, the virtual queue controller may be configured to place a number of guests in the virtual queue 124 corresponding to full ride capacity 120 (e.g., 100% ride capacity) of the amusement park attraction. For example, the virtual queue controller may place 600 guests (e.g., 100% ride capacity) in the virtual queue with return times between 2:00 pm and 3:00 pm when the guest throughput of the amusement park attraction is 600 guests per hour. However, as described above, a portion of guests will generally fail to arrive at their return time. Certain amusement park attractions include a standby line, separate from the loading line, to fill seats for the predicted no-shows 122. However, to reduce an amount of guests affected by the reduced capacity event, the amusement park attraction may close the standby line and fill the seats for the predicted no-shows 122 with guests from the reaccommodation time slot. That is, based on the amount of the predicted no-shows 122, the virtual queue controller may place an amount of guests in the reaccommodation time slot that exceeds the guest throughput at full ride capacity 120 (e.g., 100%).

For example, the guest throughput of the amusement park attraction at full capacity may be 600 guests per hour. The virtual queue controller may determine that the amount of predicted no-shows 122 between 2:00 pm and 3:00 pm is about 9% of the guests in the virtual queue. Based on the amount of predicted no-shows 122 and the guest throughput at full ride capacity, the virtual queue controller may place about 660 guests in the reaccommodation time slot 112 between 2:00 pm and 3:00 pm. The virtual ride controller may determine that, taking into account the amount of predicted no-shows 122, about 600 guests from the virtual queue should actually arrive at the amusement park attraction, such that the amusement park attraction operates at full capacity 120 with only admitting guests from the virtual queue 124. This may temporarily increase guest throughput from the virtual queue such that the reaccommodation time slot 112 may accommodate guests quicker. As such, fewer guests with return times immediately following the reduced capacity event may need to be removed from the virtual queue to accommodate the reaccommodation time slot 112.

In an embodiment, the virtual queue controller may incorporate a predetermined margin of error in while managing the virtual queue during reduced capacity events. The virtual queue controller may place an amount of guests in the reaccommodation time slot 112 that exceeds the guest throughput at full ride capacity 120 based on the amount of predicted no-shows 122 and a predetermined margin of error for the predicted no-shows 122. Accordingly, the virtual queue controller may place less excess guests in virtual queue 124 than the predicted amount of no-shows 122 to prevent potentially causing the length of the loading line to exceed a desired amount in the event that more guests arrive at their return times that anticipated based on the amount of predicted no-shows 122. For example, the virtual queue controller may determine that the amount of predicted no-shows 122 is forty guests. The predetermined margin of error for the predicted no-shows 122 may be 25%. Thus, the virtual queue controller may only allocate thirty, instead of forty, guests in excess of the guest throughput at full ride capacity 120.

Further, the virtual queue controller is configured to limit the new return times to guests removed from the virtual queue 124 during the reduced capacity event. Therefore, the virtual queue controller may be configured to not accept virtual queue requests from new guests for return times during the reaccommodation time slots 112, 114, 116. The virtual queue controller may be configured to output a signal to the guest associated devices to indicate that the amusement park attraction is unavailable during the reduced capacity event and during the reaccommodation time slot 112. Preventing new guests from queueing during the reduced capacity event and the reaccommodation time slot 112 may aid in maintaining the length of the loading line and maintain consistent throughput for the amusement park attraction during the reduced capacity event and the reaccommodation time slot 112.

Figure 5:
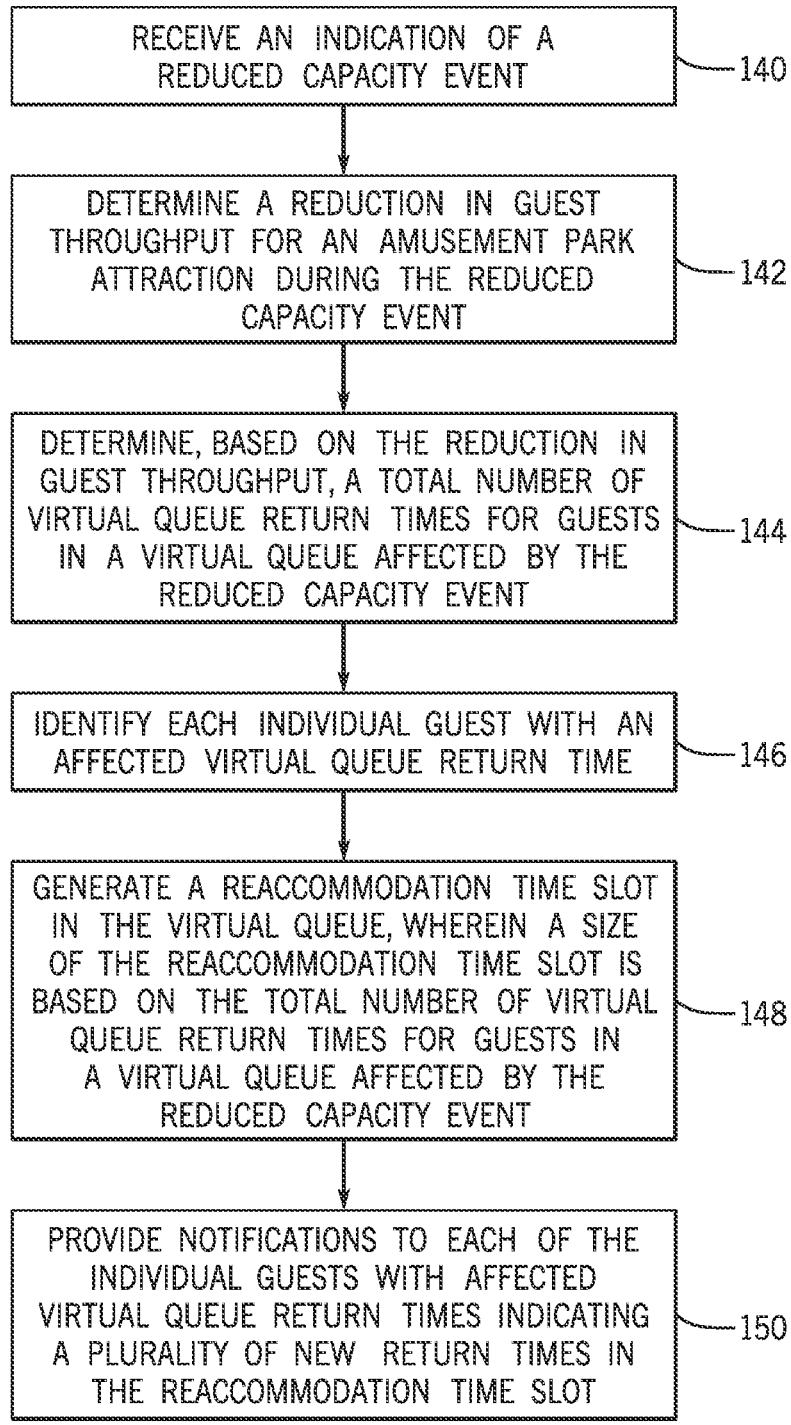
FIG. 5 is a flow chart of an embodiment of a method for determining a size of an available reaccommodation time slot for the virtual queue system, in accordance with an aspect of the present disclosure.

FIG. 5 is a flow diagram of an embodiment of a method for determining a size of a reaccommodation time slot for the virtual queue system. At the start of the method, the amusement park attraction may experience a reduced capacity event. The method includes the step of receiving an indication of a reduced capacity event (block 140). The method further includes the step of determining a reduction in guest throughput for an amusement park attraction during the reduced capacity event (block 142). The operator may output, via a user interface, the severity of the reduced capacity event such that the virtual queue controller may determine the reduction in guest throughput for the amusement park attraction during the reduced capacity event.

The method may include the step of determining, based on the reduction in guest throughput, a total number of virtual queue return times for guests in a virtual queue affected by the reduced capacity event (block 144). The method may also include determining the total number of virtual queue return times affected based on a duration of the reduced capacity event. The method may further include the step of identifying each individual guest with an affected virtual queue return time (block 146). The memory device may store individual guests virtual queue data. The virtual queue controller may analyze the virtual queue data to determine which guests had affected virtual queue return times.

The method may further include the step of generating a reaccommodation time slot in the virtual queue (block 148). A size of the reaccommodation time slot may be based on the total number of virtual queue return times for guests in a virtual queue affected by the reduced capacity event (block 148). The reaccommodation time slot may include a size sufficiently large to accommodate each guests in a virtual queue affected by the reduced capacity event. Moreover, the method may include the step of providing notifications to each of the individual guests with affected virtual queue return times indicating potential new return times in the reaccommodation time slot (block 150).

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A virtual queue system, comprising:
a ride vehicle of an attraction;
a ride vehicle controller configured to:
receive a maintenance signal; and
drive operation of the ride vehicle from a first track to a maintenance track based on the maintenance signal; and
a virtual queue controller comprising a processor and a memory, wherein the processor is configured to execute instructions accessed from the memory to cause the virtual queue controller to:
receive a signal indicative of the maintenance signal;
generate an indication of a reduced capacity event of the attraction based on the maintenance signal;
determine a percentage reduction in capacity of the attraction responsive to the indication of the reduced capacity event, wherein the reduced capacity event comprises removal of a capacity of the ride vehicle from a total capacity;
identify affected guest profiles having a return time in a virtual queue of the attraction that is affected by the reduced capacity event based on the percentage reduction in capacity;
remove the affected guest profiles from the virtual queue to maintain a predetermined relationship between attraction return times and a capacity of the attraction, wherein the capacity of the attraction is updated responsive to the percentage reduction in capacity;
generate a reaccommodation time slot for the affected guest profiles removed from the virtual queue, wherein the virtual queue controller incrementally adjusts a length of the reaccommodation time slot as guests are removed from the virtual queue, and wherein the reaccommodation time slot is subsequent to all affected return times of the affected guest profiles;
select two or more updated return times within the reaccommodation time slot for each of the affected guest profiles removed from the virtual queue;
generate and transmit a notification to guest devices of each affected guest profile removed from the virtual queue, wherein the notification causes display of a user interface on a guest device requesting guest input to select a single updated return time from the two or more updated return times; and
return each affected guest profile to the virtual queue upon receiving a corresponding selection of the single updated return time.

2. The virtual queue system of claim 1, wherein the maintenance signal comprises a duration of maintenance for the vehicle.

3. The virtual queue system of claim 2, wherein the indication of the reduced capacity event is based on the duration.

4. The virtual queue system of claim 3, wherein the reaccommodation time slot is subsequent to an estimated end of the reduced capacity event based on the duration.

5. The virtual queue system of claim 4, wherein the affected return times comprise a subset of all return times scheduled during the reduced capacity event.

6. The virtual queue system of claim 1, wherein a number of the affected return times is based on a number of seats in the ride vehicle.

7. The virtual queue system of claim 1, wherein the virtual queue controller comprises communications circuitry configured to communicate the notification to respective guest-associated devices of each guest removed from the virtual queue.

8. The virtual queue system of claim 1, wherein the reaccommodation time slot is concurrent with the reduced capacity event.

9. The virtual queue system of claim 1, wherein the virtual queue controller is configured to estimate an amount of no-show return times for the attraction based at least in part on historical data and current virtual queue data, wherein at least a portion of the reaccommodation time slot comprises excess capacity return times configured to fill predicted no show return times after the reduced capacity event ends.

10. The virtual queue system of claim 1, wherein the virtual queue controller is configured to identify the affected return times by determining a reduced capacity of the attraction associated with the reduced capacity event and determining that a relationship between existing return times in a time window and the reduced capacity is outside of a desired tolerance.

11. The virtual queue system of claim 1, wherein additional guests are not added to the virtual queue during the reduced capacity event.

12. The virtual queue system of claim 1, comprising a sensor assembly configured to generate a signal when each guest enters the attraction based on the single updated return time.

13. The virtual queue system of claim 1, wherein the virtual queue controller is configured to determine an updated percentage reduction in capacity based on removal of individual seats of ride vehicles from capacity for maintenance.

14. A method, comprising:
directing a ride vehicle to enter a maintenance track;
generating, by a processor, an indication of a reduced capacity event based on the directing, wherein the indication is associated with the ride vehicle not being part of a capacity for an attraction;
determining, by the processor, a percentage reduction in guest throughput for the attraction based on a number of seats in the ride vehicle;
identifying, by the processor, affected guest profiles having a return time in a virtual queue of the attraction that is affected by the reduced capacity event based on the percentage reduction in capacity;
removing, by the processor, affected guest profiles from the virtual queue to maintain a predetermined relationship between attraction return times and the capacity of the attraction, wherein the capacity of the attraction is updated responsive to the percentage reduction in capacity;
generating, by the processor, a reaccommodation time slot for the affected guest profiles removed from the virtual queue by incrementally adjusting a length of the reaccommodation time slot as guests are removed from the virtual queue, and wherein the reaccommodation time slot is subsequent to all affected return times of the guest profiles;
selecting, by the processor, two or more updated return times within the reaccommodation time slot for each of the affected guest profiles removed from the virtual queue;
transmitting by the processor, a notification to guest devices of each affected guest profile removed from the virtual queue, wherein the notification causes display of a user interface on a guest device requesting guest input to select a single updated return time from the two or more updated return times; and
returning by the processor, each affected guest profile to the virtual queue upon receiving a corresponding selection of the single updated return time.

15. The method of claim 14, comprising receiving an additional indication that the ride vehicle has returned to the attraction from the maintenance track.

16. The method of claim 15, comprising updating the capacity based on the additional indication.

17. The method of claim 14, wherein the reduced capacity event comprises an additional reduction in capacity based on additional vehicles being directed to enter the maintenance track.

18. The method of claim 14, comprising outputting a delay message, wherein the delay message comprises a request for confirmation from at least one individual guest of the individual guests to choose and confirm the updated return time, and providing a notification to the individual guest indicating the updated return time in response to receiving confirmation from the individual guest.

19. The method of claim 14, wherein the indication is communicated wirelessly from an operator device.

20. The method of claim 14, wherein the capacity comprises a total number of seats of available ride vehicles of the attraction.

* * * * *